United States Patent
Fujiwara et al.

(10) Patent No.: US 6,540,365 B1
(45) Date of Patent: Apr. 1, 2003

(54) PROJECTION TYPE DISPLAY APPARATUS

(75) Inventors: Shuichi Fujiwara, Nagano-ken (JP); Shoichi Akaiwa, Matsumoto (JP)

(73) Assignee: Seiko Epson, Tokyo (JP)

( * ) Notice: Subject to any disclaimer, the term of this patent is extended or adjusted under 35 U.S.C. 154(b) by 0 days.

(21) Appl. No.: 09/744,189

(22) PCT Filed: May 22, 2000

(86) PCT No.: PCT/JP00/03276

§ 371 (c)(1),
(2), (4) Date: Jan. 22, 2001

(87) PCT Pub. No.: WO00/72299

PCT Pub. Date: Nov. 30, 2000

(30) Foreign Application Priority Data

May 21, 1999 (JP) .......................................... 11-141466

(51) Int. Cl.⁷ ....................... G03B 21/00; G03B 21/14; H04N 3/22; H04N 3/26; G09G 5/00
(52) U.S. Cl. ......................... 353/69; 353/70; 353/122; 348/745; 345/619; 345/640; 345/647; 345/709; 345/716; 345/726
(58) Field of Search ........................ 353/69, 122, 70; 348/745; 345/716, 726, 619, 640, 647, 709

(56) References Cited

U.S. PATENT DOCUMENTS

| 5,311,316 A | 5/1994 | Sato | 348/584 |
|---|---|---|---|
| 5,465,121 A | * 11/1995 | Blalock et al. | 348/744 |
| 5,625,764 A | * 4/1997 | Tsujimoto et al. | 345/640 |
| 6,348,952 B1 | * 2/2002 | Jeong | 348/569 |

FOREIGN PATENT DOCUMENTS

| EP | 0158452 A1 | 12/2000 |
|---|---|---|
| JP | 7-131734 | 5/1995 |
| JP | 7-184120 | 7/1995 |
| JP | 8-289237 | 11/1996 |
| JP | 9-275538 | 10/1997 |
| JP | 09275538 | 10/1997 |
| JP | 10-79899 | 3/1998 |
| JP | 10-111533 | 4/1998 |
| JP | 10-191192 | 7/1998 |
| JP | 2001-230991 | 8/2001 |
| WO | WO 99 14716 | 3/1999 |
| WO | WO 99/43155 | 8/1999 |

* cited by examiner

Primary Examiner—Russell Adams
Assistant Examiner—Magda Cruz

(57) ABSTRACT

A projection-type display apparatus includes an on-screen-display-menu generating section for generating image data corresponding to an on-screen-display menu; an image synthesizing section for synthesizing image data for projection sent from an image source and the image data corresponding to the on-screen-display menu; and an image-distortion compensation section for applying image-distortion compensation processing used to reduce the distortion of the projected image obtained when an image is projected in an inclined direction against a screen, to the image data synthesized by the image synthesizing means.

8 Claims, 7 Drawing Sheets

PROJECTION TYPE DISPLAY APPARATUS

BACKGROUND OF THE INVENTION

1. Field of the Invention

The present invention relates to projection-type display apparatuses, namely, projectors, for projecting images on screens by illuminating liquid-crystal panels or the like with light emitted from light sources.

2. Background of the Related Art

Projection-type display apparatuses for projecting images on screens are used to project dramatic images at event sites. The screens are disposed at positions higher than the projection-type display apparatuses so as to be easily seen by many people. Therefore, the projection-type display apparatuses project toward the screens in upwardly inclined directions from the projection-type display apparatuses. When an image is projected on a screen in such a way in an upwardly inclined direction, however, the frame (display frame) of a projected image, which is a rectangle, for example, is projected in a distorted state, i.e., as if it were a trapezoid.

To solve such a problem, a projection-type display apparatus which applies image-distortion compensation (hereinafter called keystone-distortion compensation) to an image to be projected to prevent the frame (display frame) of a projected image from being projected in a distorted state as if it were a trapezoid on a screen is disclosed, for example, in Japanese Unexamined Patent Application Publication No. Hei-10-111533.

SUMMARY OF THE INVENTION

In the above-described conventional projection-type display apparatus, the keystone-distortion compensation is applied only to images input from an image source, such as a personal computer, to the projection-type display apparatus, and the keystone-distortion compensation is not applied to a (OSD; on-screen display) menu image to be displayed on the screen.

Therefore, if the OSD menu image is superposed on an image input from a personal computer and projected on the screen, only the OSD menu image has a keystone distortion.

The present invention has been made in consideration of the foregoing condition. An object of the present invention is to provide a projection-type display apparatus which reduces the keystone distortion of an OSD menu image or which makes the distortion inconspicuous.

A projection-type display apparatus of the present invention includes an on-screen-display-menu generating section that generates image data corresponding to an on-screen-display menu; an image synthesizing section that synthesizes image data for projection sent from an image source and the image data corresponding to the on-screen-display menu; and an image-distortion compensation section that applies image-distortion compensation processing used to reduce the distortion of the projected image obtained when an image is projected in an inclined direction against a screen, to the image data synthesized by the image synthesizing section.

According to the present invention, keystone-distortion compensation is applied to the synthesized image obtained by synthesizing the image data corresponding to the on-screen-display menu and the image data for projection, sent from the image source. Therefore, not only the keystone distortion of the image for projection but also that of the on-screen-display menu projected on the screen is reduced.

It is preferred that the projection-type display apparatus further include an image control section that applies image processing to the image data for projection output from the image source so as to conform to a projector that projects an image on a screen, and for sending to the image synthesizing section.

According to the present invention, the image processing is applied to the image data for projection output from the image source so as to conform to the projector that projects an image on a screen. Therefore, the keystone distortion of the image data of the on-screen-display menu, to which it is not necessary to apply the image processing, is reduced without converting the data structure.

It is further preferred that the projection-type display apparatus further include an image control section that selects either the image data for projection sent from the image source to the image synthesizing section or image data output from the image-distortion compensation section, and for applying image processing so as to conform to the projector that projects an image on the screen.

According to the present invention, whether the image processing is applied to the image data of the on-screen-display menu so as to conform to the projector before synthesis or after synthesis can be switched.

A projection-type display apparatus of the present invention includes an on-screen-display-menu generating section that generates image data corresponding to an on-screen-display menu; a first image-distortion compensation section that applies image-distortion compensation processing used to reduce the distortion of the projected image obtained when an image is projected in an inclined direction against a screen, to image data for projection sent from an image source; a second image-distortion compensation section that applies the image-distortion compensation processing correspondingly to the on-screen-display menu; and an image synthesizing section that synthesizes the image data for projection to which the first image-distortion compensation section has applied the image distortion compensation and the image data corresponding to the on-screen-display menu, to which the second image-distortion compensation section has applied the image-distortion compensation processing.

According to the present invention, keystone-distortion compensation is applied to each of the image data for projection, sent from the image source and the image data corresponding to the on-screen-display menu. Therefore, not only the keystone distortion of the image for projection but also that of the on-screen-display menu is reduced.

A projection-type display apparatus of the present invention includes an on-screen-display-menu generating section that generates image data corresponding to an on-screen-display menu; and a projection section that synthesizes the image data generated by the on-screen-display-menu generating section and image data for projection sent from an image source, and for projecting on a screen, and the on-screen-display-menu generating section generates the image data of a transparent on-screen-display menu.

According to the present invention, since only the letter-display image serving as the letter information of the on-screen-display menu is displayed on the screen, the keystone distortion of the on-screen-display menu can be made inconspicuous.

A projection-type display apparatus of the present invention includes an on-screen-display-menu generating section that generates image data corresponding to an on-screen-display menu; and a projection section that synethesizes image data generated by the on-screen-display-menu generating section and image data for projection sent from an image source, and for projecting on a screen, and the on-screen-display-menu generating section generates the image data of an on-screen-display menu so as not to have sharp corners and instead to have round corners.

According to the present invention, since the on-screen-display menu having round corners is used, the distortion of the frame of the on-screen-display menu is made inconspicuous.

A projection-type display apparatus of the present invention includes an on-screen-display-menu generating section that generates image data corresponding to an on-screen-display menu; a projection section that synethesizes the image data generated by the on-screen-display-menu generating section and image data for projection sent from an image source, and for projecting on a screen; and an image synthesizing section that synethesizes the image data corresponding to the on-screen-display menu and the image data for projection such that the image of the on-screen-display menu obtained after synthesis gradually changes to the image corresponding to the image data for projection as it approaches the periphery.

According to the present invention, since gradation is applied to the image of the on-screen-display menu, the distortion of the frame of the on-screen-display menu is made inconspicuous.

A projection-type display apparatus of the present invention includes an on-screen-display-menu generator that generates image data corresponding to an on-screen-display menu; an image synthesizer that synthesizes images data for projection sent from an image source and the image data corresponding to the on-screen-display menu; and an image-distortion compensator that applies image-distortion compensation processing used to reduce the distortion of the projected image obtained when an image is projected in an inclined direction against a screen, to the image data synthesized by the image synthesizer, and achieves the foregoing object by this configuration.

DETAILED DESCRIPTION OF THE PREFERRED EMBODIMENTS

Figure 1:
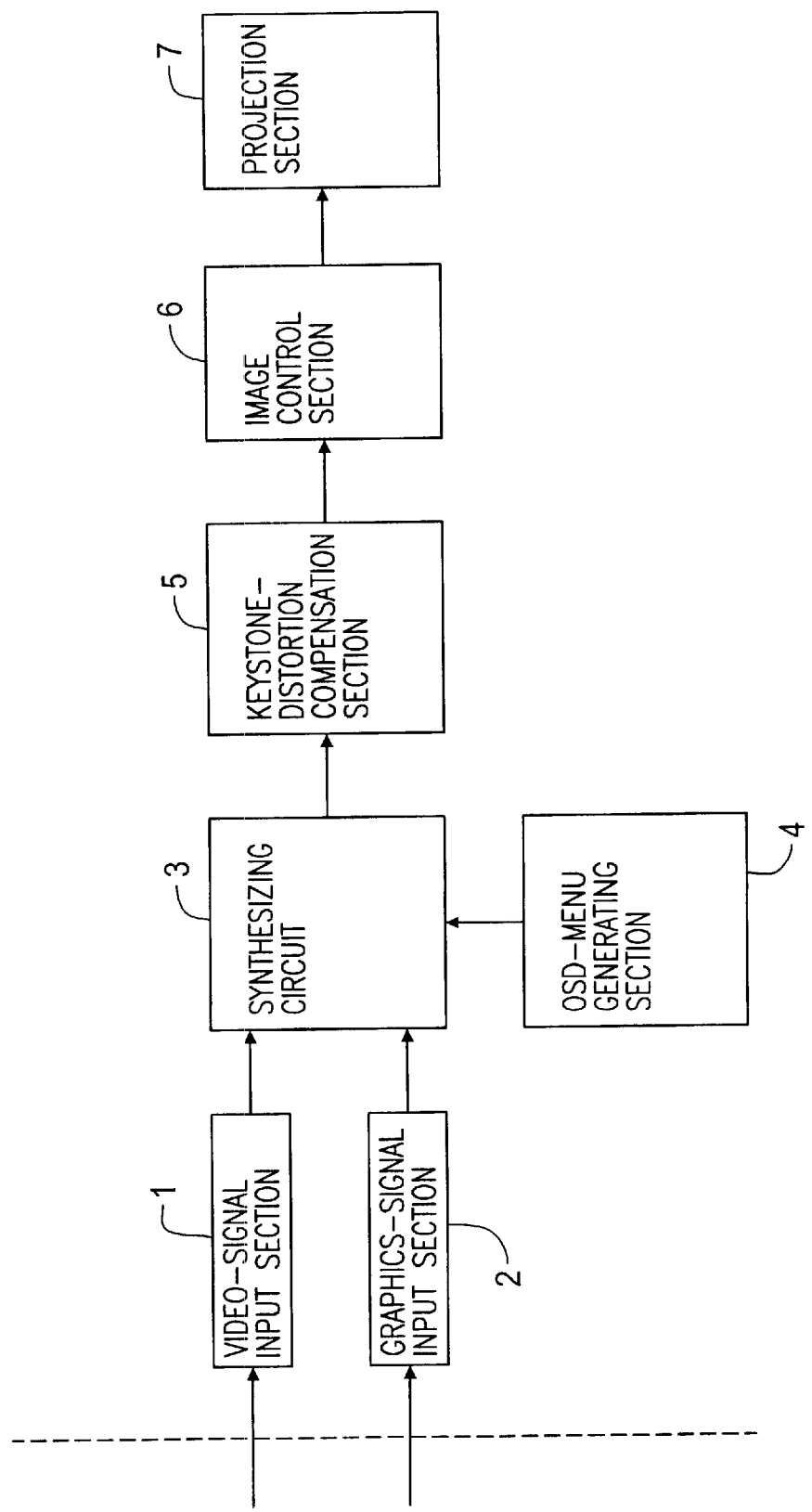
FIG. 1 is a block diagram showing the structure of a projection-type display apparatus according to a first embodiment of the present invention.

Embodiments of the present invention will be described below by referring to the drawings.

A. First Embodiment

FIG. 1 is a block diagram showing the structure of a projection-type display apparatus, namely, a projector, according to an embodiment of the present invention.

In FIG. 1, a video-signal input section 1 and a graphics-signal input section 2 are connected to a video playback apparatus to send image data to the projection-type display apparatus, and to a personal computer (neither of which are), respectively. The video-signal input section 1 converts a playback signal sent from the video playback apparatus to image data which can be displayed on a display panel of the projection-type display apparatus, and outputs the converted image data to a synthesizing circuit 3, namely, a synthesizing section. The graphics-signal input section 2 converts a graphics signal sent from the personal computer to image data which can be displayed on the display panel of the projection-type display apparatus, and outputs it to the synthesizing circuit 3 in the same way as the video-signal input section 1.

An OSD-menu-generating section 4 generates the image data of an OSD menu according to the remote-control operation of the user. An OSD menu is a menu that displays the states of various adjustment items (such as contrast and brightness) of the projection-type display apparatus and that guides the user for adjustment operations.

The synthesizing circuit 3 synthesizes the image data output from the video-signal input section 1 or the graphics-signal input section 2 and the OSD-menu image data output from the OSD-menu generating section 4, and outputs to a keystone-distortion compensation section 5.

The keystone-distortion compensation section 5 applies a keystone-distortion compensation to the image data synthesized by the synthesizing circuit 3. In the keystone-distortion compensation, to reduce the distortion of the projected image generated when an image is projected in an inclined direction against a screen, a distortion which offsets the generated distortion is applied to the image data, and the image data is output.

The image data output from the keystone-distortion compensation section 5 is sent to an image control section 6. The image data input to the image control section 6 is converted in data structure so as to conform to the structure of a projection section 7.

It is assumed that an SVGA signal having 800 (horizontal) by 600 (vertical) dots is input to the projection section 7 having, for example, a liquid-crystal display of 640 (horizontal) by 480 (vertical) pixels. In this case, since the number of scanning lines is larger than that of display lines, processing for thinning out 20% of the lines uniformly in the vertical and horizontal directions, for example, is applied to the image data output from the keystone-distortion compensation section 5.

The image data output from the image control section 6 is output to the projection section 7, and the synthesized image in which the keystone distortion has been compensated for is projected on the screen.

Details of the projection-type display apparatus according to the present embodiment have been described.

According to the present embodiment, the image data for projection, input from an image source and the OSD-menu image data output from the OSD-menu generating section 4 are synthesized by the synthesizing circuit 3, and the keystone-distortion compensation section 5 applies the keystone-distortion compensation to the synthesized image data. Therefore, the OSD menu in which the keystone distortion has been compensated for is projected on the screen.

B. Second Embodiment

Figure 2:
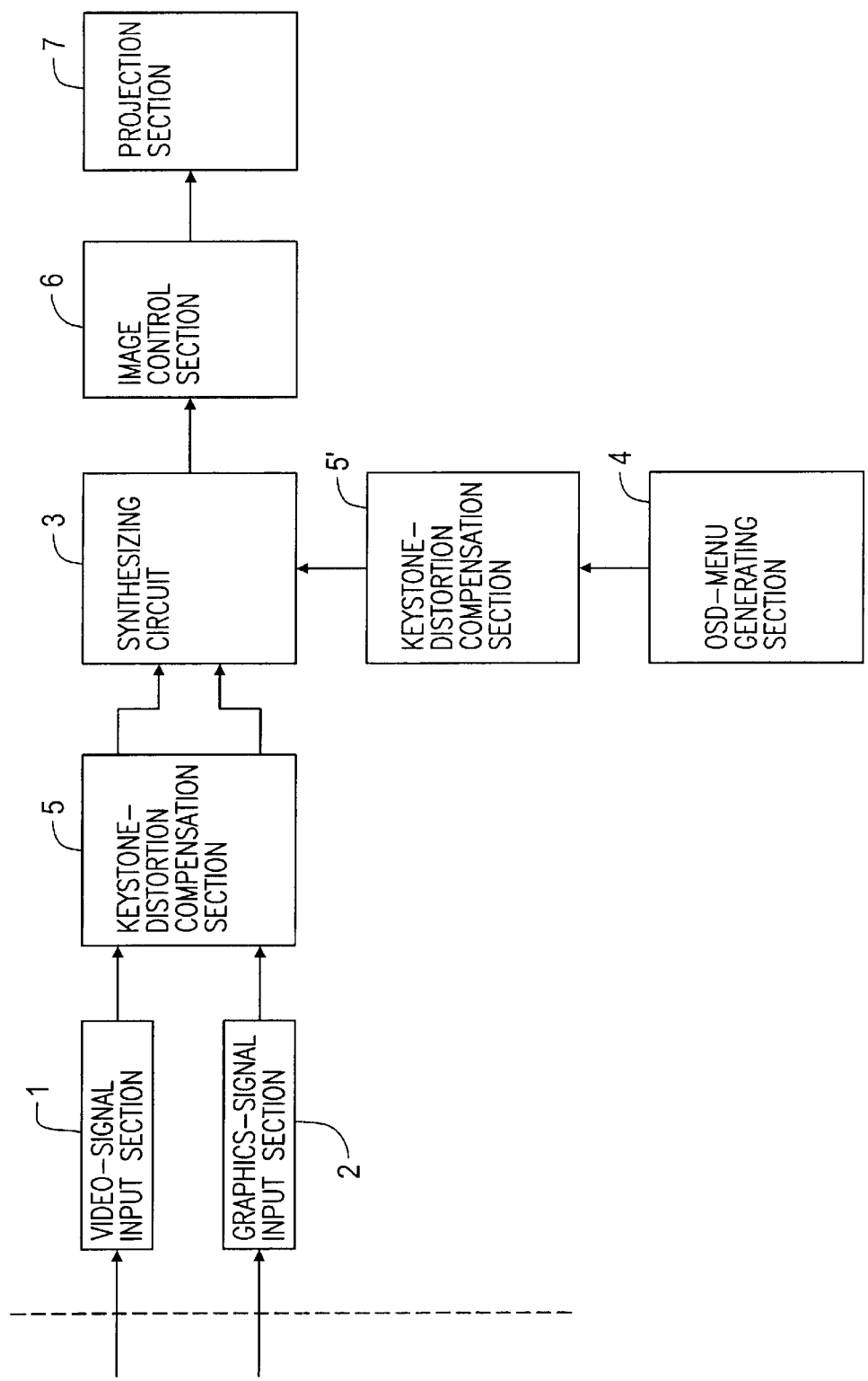
FIG. 2 is a block diagram showing the structure of a projection-type display apparatus according to a second embodiment of the present invention.

FIG. 2 is a block diagram showing the structure of a projection-type display apparatus, namely, a projector, according to a second embodiment of the present invention. In the first embodiment, the keystone-distortion compensation section 5 is provided at the next stage of the synthesizing circuit 3. In contrast, in the present embodiment, the keystone-distortion compensation section 5 is not provided at the next stage of the synthesizing circuit 3; a first keystone-distortion compensation section 5 is placed between the video-signal input section 1 and the graphics-signal input section 2, and the synthesizing circuit 3; and a second keystone-distortion compensation section 5' is placed between the OSD-menu generating section 4 and the synthesizing circuit 3.

According to the present embodiment, the first keystone-distortion compensation section 5 applies keystone-distortion compensation to image data for projection, sent from an image source, and the second keystone-distortion compensation section 5' applies keystone-distortion compensation to the image data corresponding to an OSD menu. Each image data to which the keystone-distortion compensation has been applied in this way is synthesized by the synthesizing circuit 3, namely, a synthesizing section. The image data of the synthesized image is sent to the projection section 7 through the image control section 6, and the image is projected on a screen.

Therefore, according to the present embodiment, not only the image to be projected but also the OSD menu is projected on the screen with the keystone distortion having been compensated for, in the same way as in the first embodiment.

C. Third Embodiment

Figure 3:
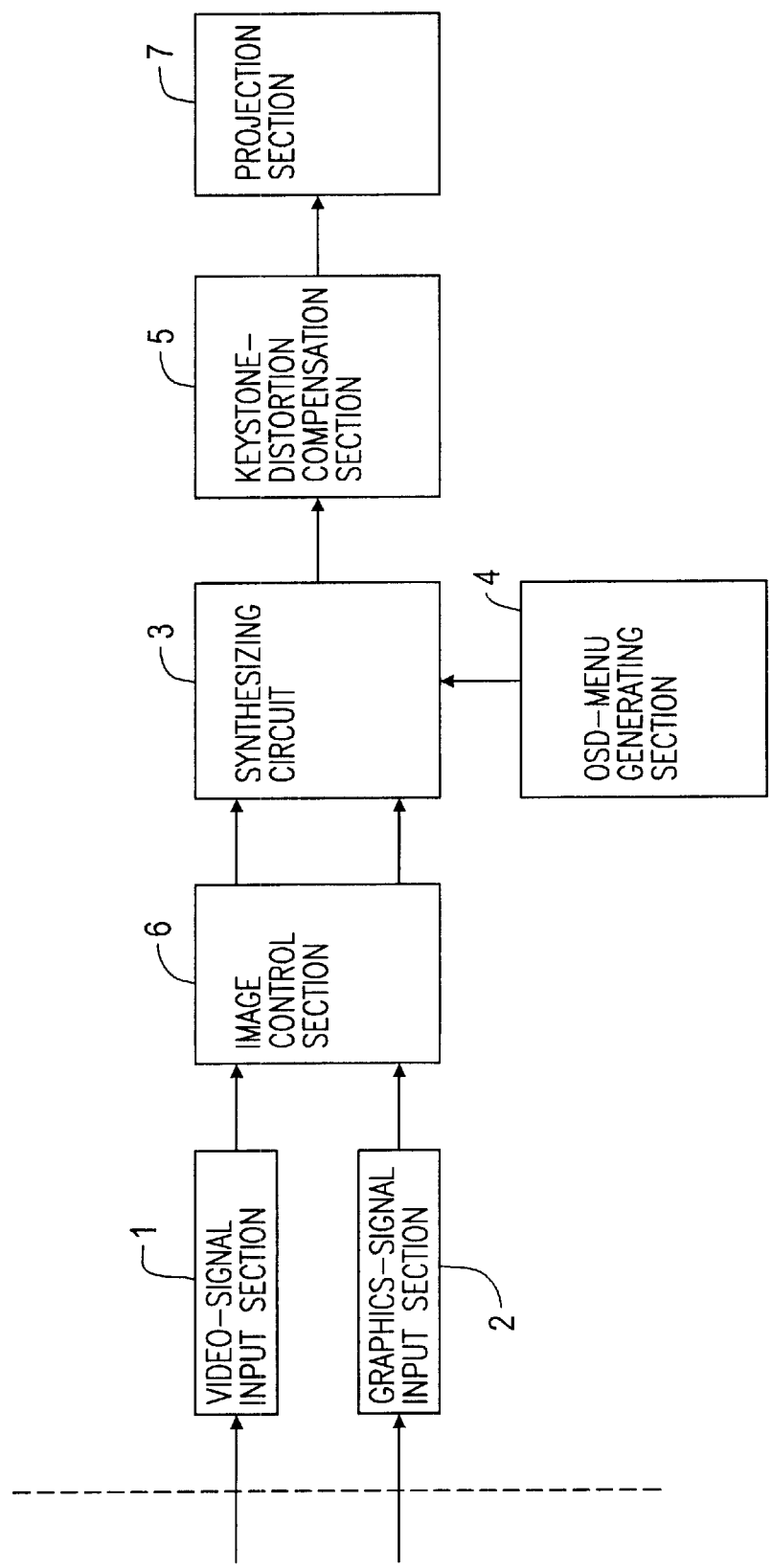
FIG. 3 is a block diagram showing the structure of a projection-type display apparatus according to a third embodiment of the present invention.

FIG. 3 is a block diagram showing the structure of a projection-type display apparatus, namely, a projector, according to a third embodiment of the present invention.

In the first embodiment, the image control section 6 is provided at the next stage of the keystone-distortion compensation section 5. In contrast, in the present embodiment, the image control section 6 is not provided at the next stage of the keystone-distortion compensation section 5; and the image control section 6 is placed between the video-signal input section 1 and the graphics-signal input section 2, and the synthesizing circuit 3.

According to the present embodiment, image data for projection output from an image source is converted in data structure by the image control section 6 so as to conform to the structure of the projection section 7; and the image data for projection to which the data-structure conversion has been applied and OSD-menu image data output from the OSD menu generating section 4 are synthesized by the synthesizing circuit 3, namely, a synthesizing section. The keystone-distortion compensation section 5 applies keystone-distortion compensation to the image data of the synthesized image, and sends it to the projection section 7 for image projection onto the screen.

According to the present embodiment, the image control section 6 applies the data-structure conversion only to the image data for projection output from the image source, and the data-structure conversion is not applied to the OSD-menu image data.

Figure 4:
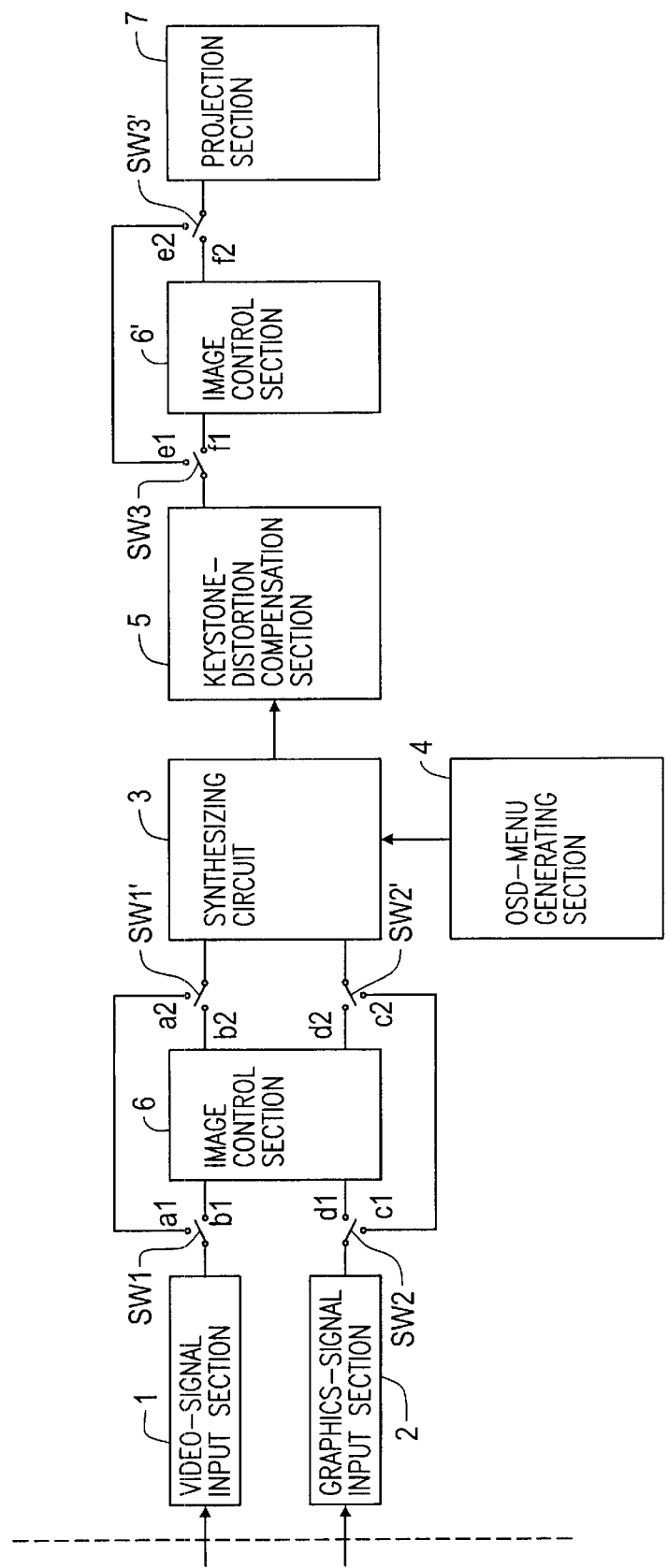
FIG. 4 is a block diagram showing the structure of a projection-type display apparatus according to a fourth embodiment of the present invention.

FIG. 4 is a view showing the structure of a projection-type display apparatus according to a modification of the third embodiment of the present invention. In the third embodiment, the image control section 6 is placed between the video-signal input section 1 and the graphics-signal input section 2, and the synthesizing circuit 3. In contrast, in the modification, a first image control section 6 is placed between the video-signal input section 1 and the graphics-signal input section 2, and the synthesizing circuit 3; and a second image control section 6' is placed between the keystone-distortion compensation section 5 and the projection section 7.

In addition, in this modification, switches SW1, SW1', SW2, SW2', SW3, and SW3' are added. The switches SW1 and SW1' switch the route from the video-signal input section 1 to the synthesizing section 3 between a route in which image data output from the video-signal input section 1 is processed by the first image control section 6 and is then sent to the synthesizing circuit 3, and a route in which image data output from the video-signal input section 1 is directly sent to the synthesizing circuit 3 without passing through the first image control section 6. In the same way, the switches SW2 and SW2' switch the route from the graphics-signal input section 2 to the synthesizing section 3 between a route in which image data output from the graphics-signal input section 2 is processed by the first image control section 6 and is then sent to the synthesizing circuit 3, and a route in which image data output from the graphics-signal input section 2 is directly sent to the synthesizing circuit 3. The switches SW3 and SW3' switch the route from the keystone-distortion compensation section 5 to the projection section 7 between a route in which image data output from the keystone-distortion compensation section 5 is sent to the projection circuit 7 through the second image control section 6', and a route in which image data output from the keystone-distortion compensation section 5 is directly sent to the projection circuit 7.

In the modification, an instruction as to whether the first image control section 6 or the second image control section 6' is made effective is given, for example, by a remote-control operation and the above switches are switched in an interlocking manner according to the instruction.

More specifically, when an instruction specifying that the first image control section 6 is to be made effective is given, the switch SW1 is switched to a terminal b1, the SW2 to a terminal d1, the SW1' to a terminal b2, the switch SW2' to a terminal d2, the switch SW3 to a terminal e1, and the switch SW3' to a terminal e2. As a result, the first image control section 6 applies the data-structure conversion only to image data output from the video-signal input section 1 or the graphics-signal input section 2, and image data output from the keystone-distortion compensation section 5 is sent to the projection section 7 without being processed by the second image control section 6'.

In contrast, when an instruction specifying that the second image control section 6' is made effective is to be given, the switch SW1 is switched to a terminal a1, the SW2 to a terminal c1, the SW1' to a terminal a2, the switch SW2' to a terminal c2, the switch SW3 to a terminal f1, and the switch SW3' to a terminal f2. As a result, image data output from the video-signal input section 1 or the graphics-signal input section 2 is sent to the synthesizing circuit 3 without the processing of the first image control section 6, and image data output from the keystone-distortion compensation section 5 is sent to the projection section 7 through the data-structure conversion processing of the second image control section 6'.

According to the present modification, it is advantageous that whether the data-structure conversion processing is applied to image data (data output from the video-signal input section 1 or the graphics-signal input section 2) obtained before OSD-menu image data is combined, or the data-structure conversion processing is applied to image data (in the example shown in FIG. 4, data output from the keystone-distortion compensation section 5) obtained after OSD-menu image data is combined can be specified.

D. Fourth Embodiment

In the first to third embodiments, the keystone-distortion compensation section 5 achieves keystone-distortion compensation to reduce the keystone distortion of the OSD menu image.

In the present embodiment, keystone-distortion compensation is not applied to OSD-menu image data. An OSD-menu image is formed of letters (such as "CONTRAST" and "BRIGHTNESS") only, to make keystone distortion inconspicuous. Details will be described below.

Figure 5:
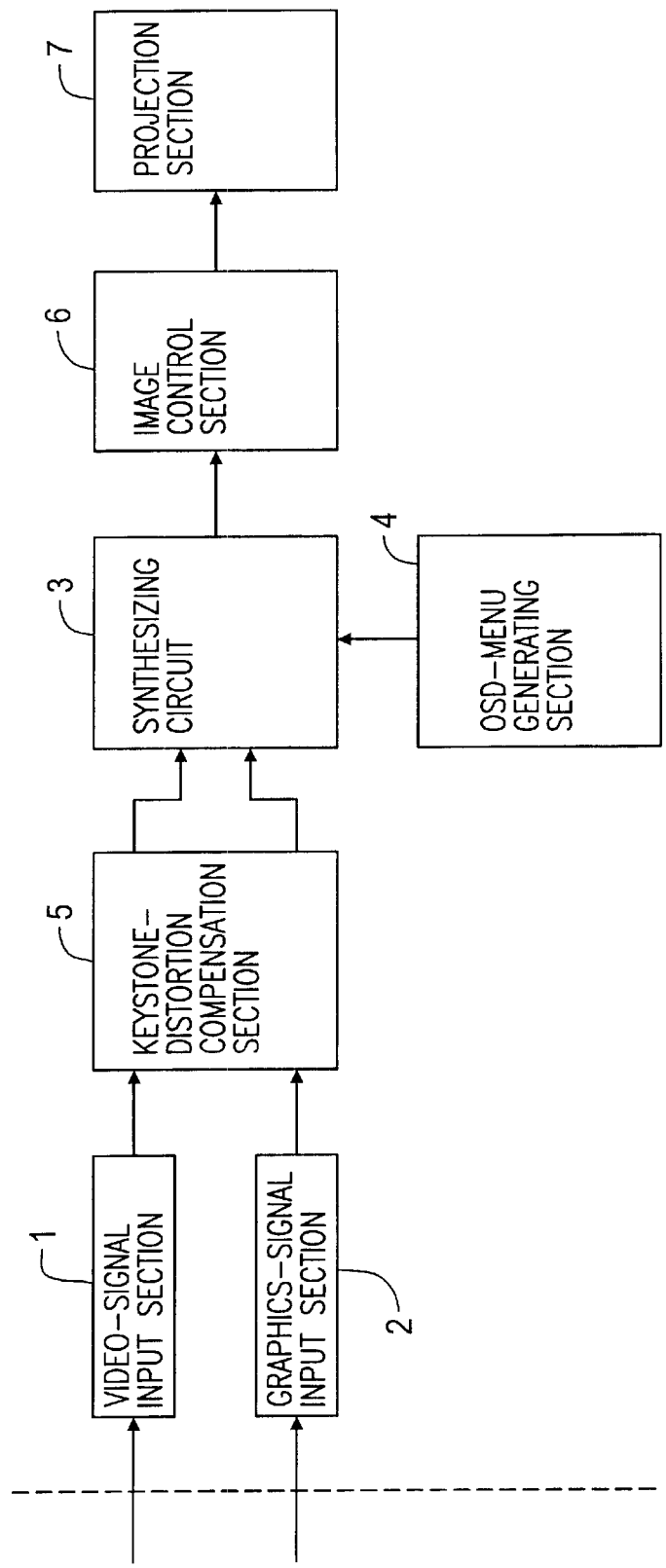
FIG. 5 is a block diagram showing the structure of the projection-type display apparatus according to the fourth embodiment.

FIG. 5 is a block diagram showing the structure of a projection-type display apparatus, namely, a projector, according to a fourth embodiment of the present invention. The OSD-menu generating section 4 generates OSD-menu image data formed of letters only and inputs it to the synthesizing circuit 3, namely, a synthesizing section. The keystone-distortion compensation section 5 applies keystone-distortion compensation to image data for projection, input from an image source, and inputs it to the synthesizing circuit 3. Each image data is synthesized by the synthesizing circuit 3, and the image data of the synthesized image is sent to the projection section 7 through the image control section 6 and projected on a screen.

Figure 6A:
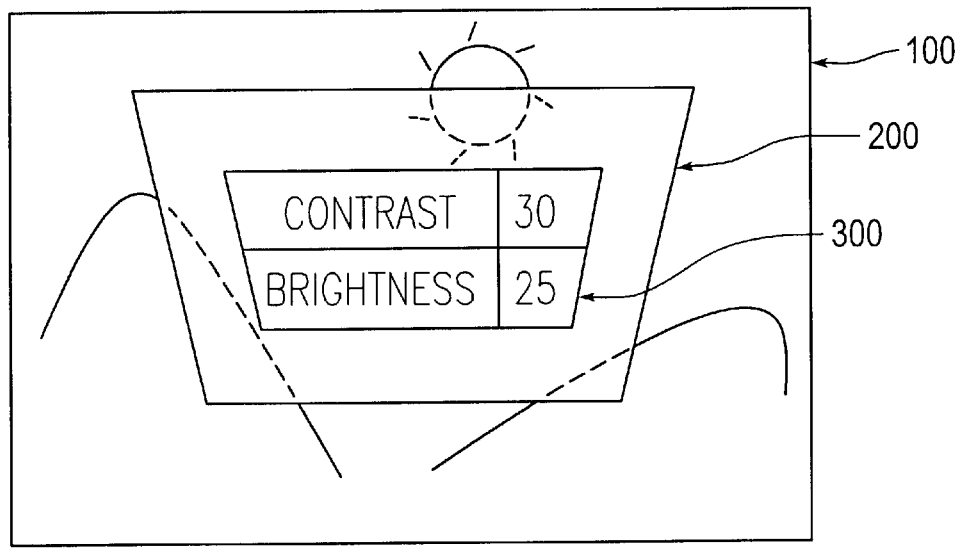
FIG. 6 is a typical view of an image projected by the projection-type display apparatus according to the fourth embodiment.
Figure 6B:
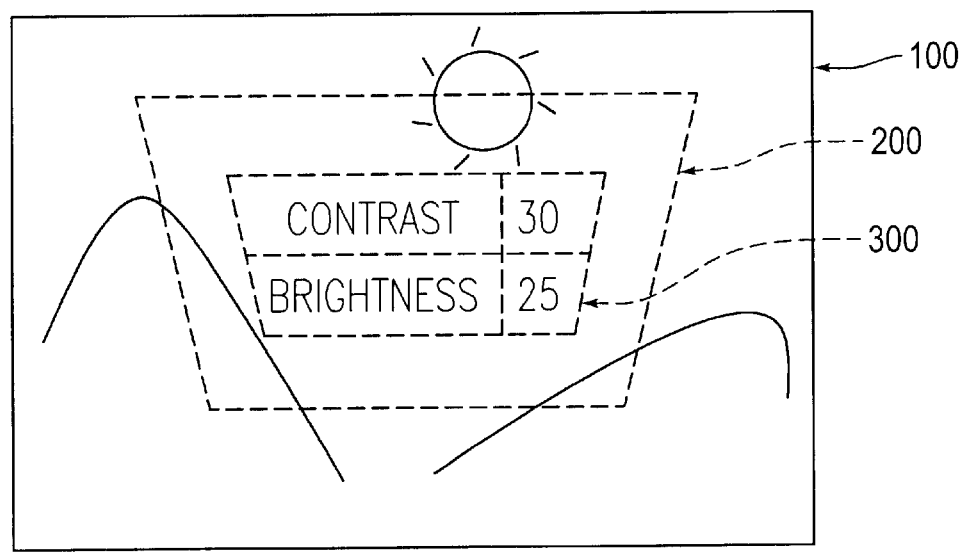

FIG. 6(a) and FIG. 6(b) are typical views of screens on which background images input from the image source and OSD-menu images are displayed.

FIG. 6(a) is a typical view of a screen on which a conventional OSD-menu image is displayed. The OSD-menu image 200 and a letter-display image 300 are superposed onto a background image 100 and displayed. Since keystone-distortion compensation is not applied to the OSD-menu image 200 shown in FIG. 6(a), keystone distortion is conspicuous at a frame outside of the letters.

In contrast, in FIG. 6(b), an OSD-menu image is formed of letters (letter-display image 300) only, distortion is inconspicuous although keystone-distortion compensation is not applied.

In this way, in the present embodiment, only the letter-display image 300, serving as the letter information of the OSD menu, is displayed on the screen. In other words, the portions other than the letters of the OSD-menu image are transparent. Therefore, the background image corresponding to the image source is displayed at the portions other than the letters of the OSD-menu image. As a result, keystone distortion is not conspicuous in the OSD menu.

According to another embodiment, keystone distortion can be made inconspicuous by modifying the external shape of an OSD menu without making the portions other than letters transparent.

Figure 7:
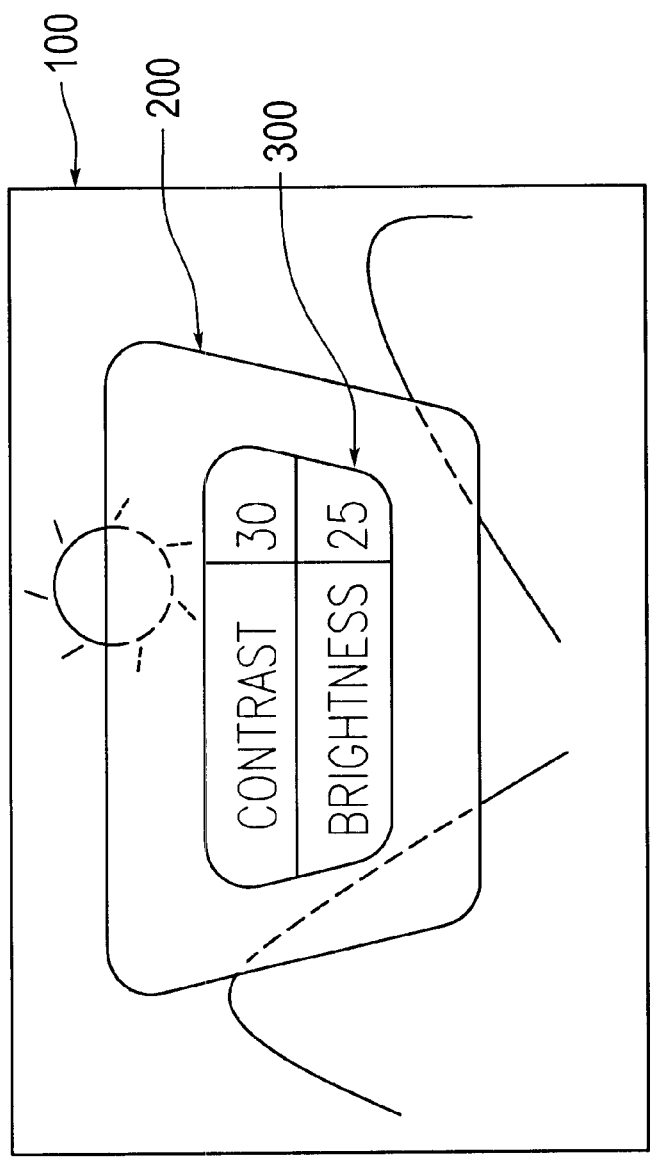
FIG. 7 is a view of an OSD-menu image having round corners projected by the projection-type display according to the fourth embodiment.

Distortion is conspicuous in an OSD-menu image which has sharp corners. Therefore, for example, the OSD-menu generating section 4 generates in advance the image data of an OSD menu having round corners. It is further possible that the user selects an OSD-menu image pattern (such as an OSD-menu image having round corners as shown in FIG. 7) by a remote controller according to the condition (for example, a case in which images are projected on a screen in an upwardly inclined direction) in which the projection-type display apparatus is used.

E. Fifth Embodiment

In the fourth embodiment, only the letter-display image 300, serving as the letter information of the OSD menu, is displayed on the screen to make keystone distortion inconspicuous. It is also possible that gradation is applied so as to make the boundary of the OSD-menu image 200 and the background image 100 inconspicuous to make the keystone distortion of the OSD menu inconspicuous. The gradation is achieved, for example, in the structure shown in FIG. 5, when the synthesizing circuit 3, namely, the synthesizing section, synthesizes the OSD-menu image and the background input from the image source. More specifically, the synthesizing circuit 3 calculates the color density C of the synthesized image by the following expression at portions where the OSD-menu image 200 and the background image 100 overlap.

$C = k*A + (1-k)*B$ $0 \leq k \leq 1$ $A < B$

Where, k is a variable indicating the relative distance from the center point of the OSD menu to the frame (the boundary with the background image) of the OSD menu, A represents the color density of the background image 100, B represents the color density of the OSD-menu image 200, and C represents the color density of the OSD menu obtained when k is given.

As a result, in the synthesized image, the OSD-menu image 200 has the thickest color at its center (k=0), has colors which become gradually thinner at points more distant from the center, and has the same density as the background image 100 at the boundary with the background image 100. It is possible in this way to make the keystone distortion of the OSD menu inconspicuous by applying gradation so as to make the boundary between the OSD-menu image 200 and the background image 100 inconspicuous.

In the present embodiment, the gradation is applied to the OSD-menu image 200 in this way to make the boundary of an area where the background image 100 input from the image source and the OSD-menu image 200 overlap inconspicuous. Therefore, the keystone distortion of the OSD menu is not conspicuous.

As described above, according to the present invention, since a projection-type display apparatus is provided with an on-screen-display-menu generator that generates the image data corresponding to an on-screen-display menu; an image synthesizer that synthesizes image data for projection sent from an image source and the image data corresponding to the on-screen-display menu; and an image-distortion compensator that applies image-distortion compensation processing used to reduce the distortion of the projected image obtained when an image is projected in an inclined direction against a screen, to the image data synthesized by the image synthesizer, the keystone distortion of the image corresponding to the on-screen display menu is reduced.

The present invention can be applied to projection-type display apparatuses, namely, projectors, for projecting images on screens by illuminating liquid-crystal panels or the like by the light emitted from light sources.

What is claimed is:

1. A projection-type display apparatus, comprising:
   an on-screen-display-menu generating section that generates image data corresponding to an on-screen-display menu;
   an image synthesizing section that synthesizes image data for projection sent from an image source and the image data corresponding to the on-screen-display menu; and
   an image-distortion compensation section that applies image-distortion compensation processing used to reduce the distortion of the projected image obtained when an image is projected in an inclined direction against a screen, to the image data synthesized by the image synthesizing section, whereby the distortion of the projected image is reduced for both the image data for projection sent from the image source and the image data corresponding to the on-screen display menu.

2. The projection-type display apparatus according to claim 1, further comprising a projector and an image control section that applies image processing to the image data for projection output from the image source so as to conform to the projector that projects an image on a screen, and for sending to the image synthesizing section.

3. The projection-type display apparatus according to claim 2, further comprising an image control section that selects either the image data for projection sent from the image source to the image synthesizing section or image data output from the image-distortion compensation section, and that applies image processing so as to conform to the projector that projects an image on a screen.

4. A projection-type display apparatus, comprising:

an on-screen-display-menu generating section that generates image data corresponding to an on-screen-display menu;

a first image-distortion compensation section that applies image-distortion compensation processing used to reduce the distortion of the projected image obtained when an image is projected in an inclined direction against a screen, to image data for projection sent from an image source;

a second image-distortion compensation section that applies the image-distortion compensation processing correspondingly to the on-screen-display menu; and an image synthesizing section that synthesizes the image data for projection to which the first image-distortion compensation section has applied the image distortion compensation and the image data corresponding to the on-screen-display menu, to which the second image-distortion compensation section has applied the image-distortion compensation processing, whereby the distortion of the projected image is reduced for both the image data for projection sent from the image source and the image data corresponding to the on-screen display menu.

5. A projection-type display apparatus, comprising:

an on-screen-display-menu generating section that generates image data corresponding to an on-screen-display menu; and a projection section that synthesizes the image data generated by the on-screen-display-menu generating section and image data for projection sent from an image source, and for projecting on a screen, wherein the on-screen-display-menu generating section generates the image data of a transparent on-screen-display menu having only a character-display image serving as the image data corresponding to the on-screen-display menu to make inconspicuous distortion due to projecting on the screen.

6. A projection-type display apparatus, comprising:

an on-screen-display-menu generating section that generates image data corresponding to an on-screen-display menu having a frame; and a projection section that synthesizes the image data generated by the on-screen-display-menu generating section and image data for projection sent from an image source, and for projecting on a screen, wherein the on-screen-display-menu generating section generates the image data of an on-screen-display menu that does not have sharp corners and instead has round corners, whereby the round corners of the on-screen-display menu make inconspicuous distortion of the frame of the on-screen-display menu due to projecting on the screen.

7. A projection-type display apparatus, comprising:

an on-screen-display-menu generating section that generates image data corresponding to an on-screen-display menu having a frame;

a projection section that synthesizes the image data generated by the on-screen-display-menu generating section and image data for projection sent from an image source, and for projecting on a screen; and an image synthesizing section that synthesizes the image data corresponding to the on-screen-display menu and the image data for projection such that the image of the on-screen-display menu obtained after synthesis gradually changes to the image corresponding to the image data for projection in gradation as it approaches a periphery, whereby the gradation of the image of the on-screen-display menu makes inconspicuous distortion of the frame of the on-screen-display menu due to projecting on the screen.

8. A projection-type display apparatus, comprising:

an on-screen-display-menu generator that generates image data corresponding to an on-screen-display menu;

an image synthesizer that synthesizes image data for projection sent from an image source and the image data corresponding to the on-screen-display menu; and an image-distortion compensator that applies image-distortion compensation processing used to reduce the distortion of the projected image obtained when an image is projected in an inclined direction against a screen, to the image data synthesized by the image synthesizer, whereby the distortion of the projected image is reduced for both the image data for projection sent from the image source and the image data corresponding to the on-screen display menu.

* * * * *

UNITED STATES PATENT AND TRADEMARK OFFICE
CERTIFICATE OF CORRECTION

PATENT NO.   : 6,540,365 B1
DATED        : April 1, 2003
INVENTOR(S)  : Shuichi Fujiwara and Shoichi Akaiwa It is certified that error appears in the above-identified patent and that said Letters Patent is hereby corrected as shown below:

<u>Title page,</u>
Item [54], Title, "PROJECTION TYPE DISPLAY APPARATUS" should be
-- PROJECTION-TYPE DISPLAY APPARATUS --

Signed and Sealed this

Eleventh Day of November, 2003

JAMES E. ROGAN
*Director of the United States Patent and Trademark Office*